United States Patent
Mark et al.

(10) Patent No.: US 12,054,274 B2
(45) Date of Patent: Aug. 6, 2024

(54) HYBRID ELECTRIC SYSTEMS FOR ROTORCRAFT

(71) Applicant: Pratt & Whitney Canada Corp., Longueuil (CA)

(72) Inventors: Michael R. Mark, Montreal (CA); Leonid Guerchkovitch, Dollard des Ormeaux (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 169 days.

(21) Appl. No.: 17/207,553

(22) Filed: Mar. 19, 2021

(65) Prior Publication Data

US 2022/0297846 A1    Sep. 22, 2022

(51) Int. Cl.
| | |
|---|---|
| *B64D 31/06* | (2024.01) |
| *B60L 50/61* | (2019.01) |
| *B64C 27/00* | (2006.01) |
| *B64D 27/02* | (2006.01) |
| *B64D 27/24* | (2006.01) |
| *B64D 35/08* | (2006.01) |

(52) U.S. Cl.
CPC .............. *B64D 31/06* (2013.01); *B60L 50/61* (2019.02); *B64C 27/00* (2013.01); *B64D 27/02* (2013.01); *B64D 27/24* (2013.01); *B64D 35/08* (2013.01); *B60L 2200/10* (2013.01); *B64D 27/026* (2024.01)

(58) Field of Classification Search
CPC .......................... B64D 2027/026; B64D 31/06
See application file for complete search history.

(56) References Cited

U.S. PATENT DOCUMENTS

| | | | | |
|---|---|---|---|---|
| 2014/0034781 A1* | 2/2014 | Kouros | ................... | B64C 27/12 244/60 |
| 2014/0117148 A1* | 5/2014 | Dyrla | ..................... | B64D 27/24 244/17.13 |
| 2016/0375994 A1* | 12/2016 | Rossotto | ................. | B64C 27/12 701/3 |
| 2017/0225794 A1 | 8/2017 | Waltner | | |

(Continued)

FOREIGN PATENT DOCUMENTS

FR    3039614 A1 *    2/2017    ............ B64C 27/12

OTHER PUBLICATIONS

Wikipedia, Freewheel, Feb. 1, 2020, [web.archive.org/web/20200201122310/https://en.wikipedia.org/wiki/Freewheel] (Year: 2020).*

(Continued)

*Primary Examiner* — Timothy D Collins
*Assistant Examiner* — Justin Michael Heston
(74) *Attorney, Agent, or Firm* — NORTON ROSE FULBRIGHT CANADA LLP

(57) ABSTRACT

A hybrid electric system for a rotorcraft can include a first thermal engine, a second thermal engine, and an electrical machine. The first thermal engine can be sized to produce a maximum first thermal engine power that is below a one-or-more-engine-inoperative (OEI) requirement power and the second thermal engine can be sized to produce a maximum second thermal engine power that is below the OEI requirement power. The electrical machine can be sized to provide at least a remaining power needed to reach the OEI requirement power in an OEI state.

18 Claims, 2 Drawing Sheets

(56) References Cited

U.S. PATENT DOCUMENTS

2019/0382124 A1* 12/2019 Massot .................. B64D 35/08
2020/0342772 A1    10/2020 Michael et al.
2020/0362753 A1* 11/2020 Beauchesne-Martel .....................
                                                              F02C 6/02

OTHER PUBLICATIONS

Extended European Search Report, of the European Patent Office, mailed on Jul. 25, 2022, in corresponding European Patent Application No. 22163090.8.
Extended European Search Report for European Patent Application No. EP22163090.8, dated Jul. 25, 2022.

* cited by examiner

HYBRID ELECTRIC SYSTEMS FOR ROTORCRAFT

FIELD

This disclosure relates to hybrid electric aircraft systems.

BACKGROUND

Traditional helicopter architectures using two gas turbine engines are designed to meet operation and safety requirements. Each gas turbine engine is typically sized to provide additional (but temporary) power above rated maximum takeoff power (MTOP) in the event of failure of one of the gas turbine engines, for example.

Such conventional methods and systems have generally been considered satisfactory for their intended purpose. However, there is still a need in the art for improved power systems for rotorcraft, such as with respect to performance.

SUMMARY

A hybrid electric system for a rotorcraft can include a first thermal engine, a second thermal engine, and an electrical machine. The first thermal engine can be sized to produce a maximum first thermal engine power that is below a one-or-more-engine-inoperative (OEI) requirement power and the second thermal engine can be sized to produce a maximum second thermal engine power that is below the OEI requirement power. The electrical machine can be sized to provide at least a remaining power needed to reach the OEI requirement power in an OEI state.

In certain embodiments, the system can include a main gear box operatively connected to each of the first thermal engine, the second thermal engine, and the electrical machine. The main gear box can be configured to receive power therefrom and to combine the output to one or more rotors. Any suitable number of gear boxes connected to any individual or combination of power sources is contemplated herein (e.g., multiple gear boxes for multirotor systems).

The system can include a battery sized to allow for the OEI power requirement to be reached for at least a required OEI power time. For example, the OEI power time can be between about 30 seconds and about 2.5 minutes. Any other suitable time is contemplated herein (e.g., enough time to meet safety regulations). In certain embodiments, the electrical machine can be configured to be driven by the first and/or second thermal engine in an excess thermal power setting to generate electrical energy to charge the battery (e.g., to charge the battery during cruise after transient use).

The system can include one or more control modules operatively connected to the first thermal engine, the second thermal engine, and the electrical machine to control power output therefrom. In a normal take-off mode, the controller can be configured to cause output power only from the first thermal engine and the second thermal engine.

In a performance take-off mode, the controller can be configured to additionally cause output power to the main gear box from the electrical machine. In a normal cruise mode, the controller can be configured to reduce power of one of the first or second thermal engine to idle or off, and to operate the other of the first or second thermal engine at a set thermal cruise power suitable for level flight.

The controller can be configured such that, during cruise, if a demanded power changes to be above the set thermal cruise power, the controller causes the electrical machine to output an electrical machine power that is a difference of power between a current thermal power and the demanded power until a total thermal power produced by either or both of the first thermal engine and/or the second thermal engine reaches the demanded power. In certain embodiments, the electrical machine power ramps down as the total thermal power ramps up to maintain the demanded power.

In certain embodiments, the controller can be configured such that, in cruise, if the thermal engine that is producing the set thermal cruise power fails, the controller is configured to ramp up power from the idle or off thermal engine to the demanded power and to produce the remaining power required using the electrical machine. The controller can be configured to have any suitable control logic (e.g., otherwise disclosed herein or appreciated by those having ordinary skill in the art in view of this disclosure).

A rotorcraft can include a rotor and any suitable embodiment of a system as disclosed herein, e.g., as described above, connected to the rotor to power the rotor. Any other suitable components are contemplated herein.

A non-transitory computer readable medium can include computer executable instructions configured to cause a computer to perform a method for controlling power in a multiengine rotorcraft. The method can include reducing power of one of a first or second thermal engine to idle or off, and operating the other of the first or second thermal engine at a set thermal cruise power suitable for level flight. During cruise, if a demanded power changes to be above the set thermal cruise power, the method can include causing an electrical machine to output an electrical machine power that is a difference of power between a current thermal power and the demanded power until a total thermal power produced by either or both of the first thermal engine and/or the second thermal engine reaches the demanded power. In certain embodiments, the method can include ramping electrical machine power down as the total thermal power ramps up to maintain the demanded power.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
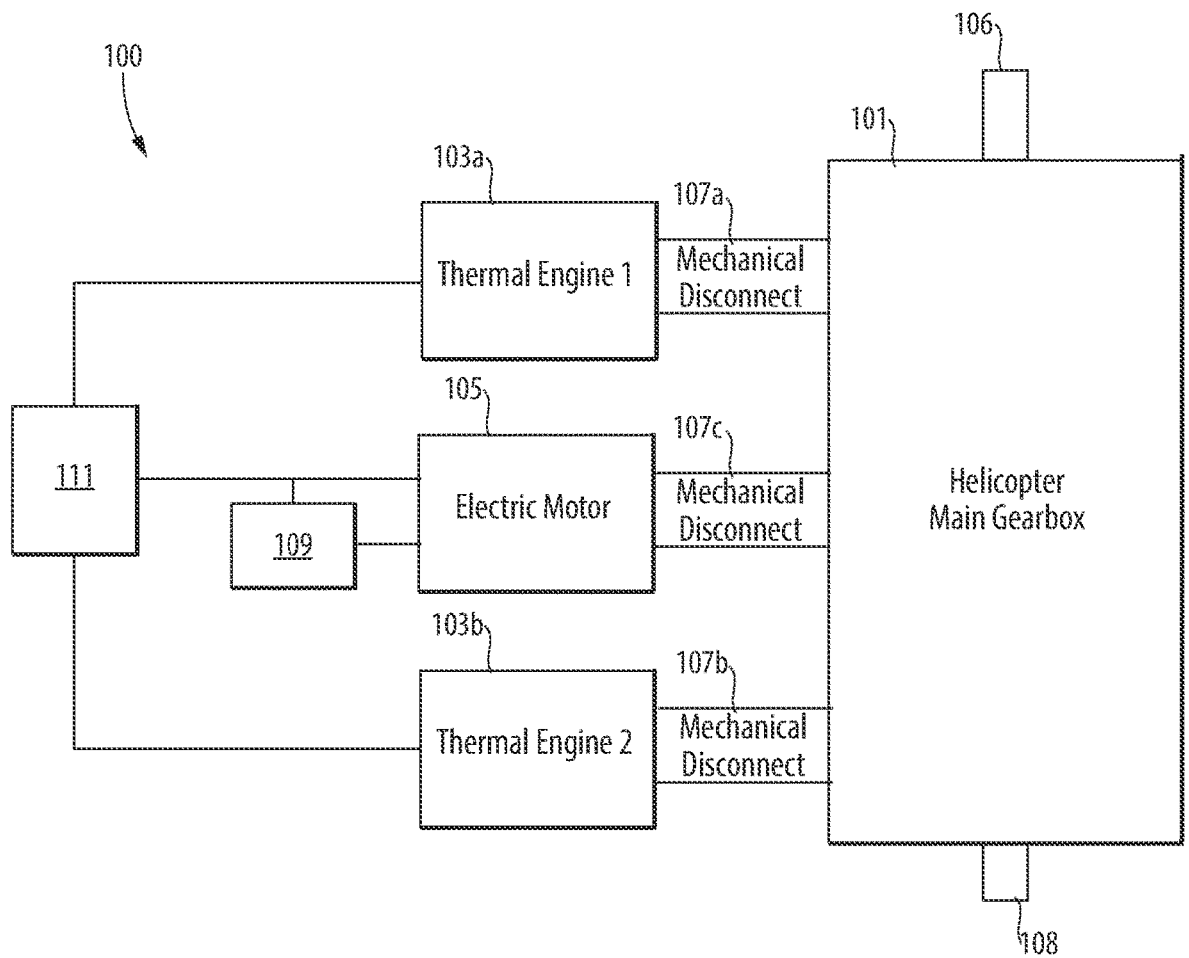
FIG. 1 is a schematic diagram of an embodiment of a system in accordance with this disclosure.
Figure 2:
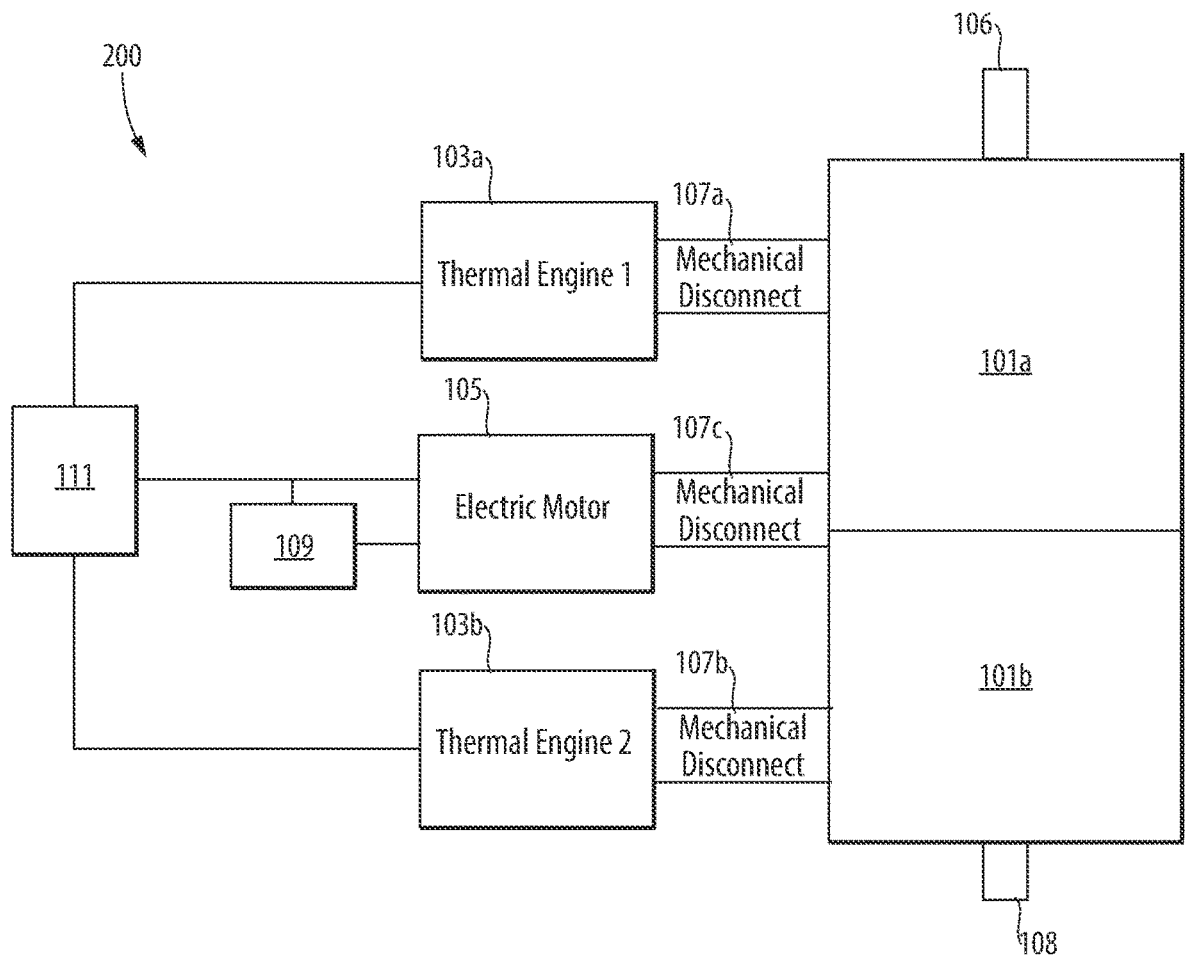
FIG. 2 is a schematic diagram of another embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated by reference character 100. Other embodiments and/or aspects of this disclosure are shown in FIG. 2. Certain embodiments described herein can be used to provide lighter, smaller, safer, and more energy efficient power systems and rotorcraft.

Referring to FIG. 1, in certain embodiments a hybrid electric system 100 for a rotorcraft (e.g., a helicopter) can include a first thermal engine 103a (e.g., a turbine engine, an internal combustion engine), a second thermal engine 103b (e.g., a turbine engine, an internal combustion engine), and an electrical machine 105 (e.g., useable as a motor and a generator). The first thermal engine 103a can be sized to produce a maximum first thermal engine power that is below a one-or-more-engine-inoperative (OEI) requirement power (e.g., as defined by FAA safety regulations) and the second thermal engine 103b can be sized to produce a maximum second thermal engine power that is below the OEI requirement power. The one-or-more-engine-inoperative power can be a one-engine-inoperative power. Any suitable power requirement for any suitable number of engines inoperative is contemplated herein. The electrical machine 105 can be sized to provide at least a remaining power needed to reach the OEI requirement power in an OEI state, for example.

Any suitable mechanical arrangement (e.g., one or more gear boxes) to deliver power from the power sources is contemplated herein. In certain embodiments, as shown in FIG. 1 the system 100 can include a main gear box 101 operatively connected to each of the first thermal engine 103a, the second thermal engine 103b, and the electrical machine 105. The main gear box 101 can be configured to receive power from each of the power sources and combine the output to one or more rotors 106, 108 (e.g., a main rotor 106 and a tail rotor 106). Any suitable number of gear boxes 101 connected to any individual or combination of power sources is contemplated herein (e.g., multiple gear boxes for multirotor systems). Any suitable number of output rotors can be connected to one or more gear boxes 101 (e.g., a main rotor 106, a tail rotor 108, auxiliary rotor).

For example, as shown in FIG. 2, a system 200, e.g. for a multirotor aircraft, can include a first gearbox 101a for driving a first rotor 106a and a second gear box 101b for driving a second rotor 106b. As shown the first thermal engine 103a can be connected to the first gearbox 101a, the second thermal engine 103b can be connected to the second gearbox 101b, and the electrical machine 105 can be connected to both gearboxes 101a, 101b. Any suitable other arrangements and/or connections are contemplated herein.

The OEI requirement power can be defined by a required torque ratio (e.g., a percentage of normal takeoff torque) as appreciated by those having ordinary skill in the art, or defined as a function of a performance metric (e.g., the ability to climb, e.g., at 150 feet per minute, for a certain period of time, e.g., 30 seconds or two and a half minutes) as appreciated by those having ordinary skill in the art. One having ordinary skill in the art appreciates how to determine an appropriate OEI power requirement based on the aircraft and/or applicable regulations.

Each of the thermal engines 103a, 103b can be connected to the main gear box 101 via a mechanical disconnect 107a, 107b. The electric motor 105 can also be connected to the main gear box 101 via a mechanical disconnect 107c. Any suitable connection type (e.g., the same or different for any or each) is contemplated herein.

The system 100 can include a battery 109 (e.g., having one or more cells) sized to allow for the OEI power requirement to be reached for at least a required OEI power time. For example, the OEI power time can be between about 30 seconds and about 2.5 minutes. Any other suitable time is contemplated herein (e.g., enough time to meet safety regulations). In certain embodiments, the electrical machine 105 can be configured to be driven by the first and/or second thermal engine 103a, 103b in an excess thermal power setting (e.g., during level cruise or any other time when desired or required) to generate electrical energy to charge the battery (e.g., to charge the battery, such as for example during cruise after transient use, for example to keep the battery at full charge or in a sufficient OEI requirement energy range). Any suitable charging scheme (e.g., to provide charge as soon as possible after use of the battery when excess power over what is demanded is available) is contemplated herein.

The system 100 can include one or more control modules 111 operatively connected to the first thermal engine 103a, the second thermal engine 103b, and the electrical machine 105 to control power output therefrom (e.g., from each source independently of the others, or combined output from any combination, or total output from all). In certain embodiments, the one or more control modules 111 can include a separate controller for each thermal engine and/or the electric motor (e.g., three separate controllers or any other suitable number). In certain embodiments, the one or more control modules 111 can include a single controller. The one or more control modules 111 can include any suitable computer hardware and/or software module(s) configured to perform any suitable function(s) disclosed herein (e.g., controlling torque from each engine and the electrical machine, controlling energy flow, e.g., discharging or charging the battery, controlling performance based on selected mode or flight state, etc.). Any suitable delineation of control modules (e.g., hardware and/or software is contemplated herein). The one or more control modules 111 can be configured to allow selection of a normal mode or a performance mode, for example, by the pilot. The one or more control modules 111 can be configured to determine an emergency state based on a condition of one or more of the thermal engines 103a, 103b and/or the electrical machine 105

In a normal take-off mode, the one or more control modules 111 can be configured to cause output power only from the first thermal engine 103a and the second thermal engine 103b (e.g., so as to not utilize the electrical machine or energy stored in the battery). In a performance take-off mode, the one or more control modules 111 can be configured to additionally cause output power to the main gear box 101 from the electrical machine 105 (e.g., to increase takeoff climb rate at the expense of battery charge state). In certain embodiments, the one or more control modules 111 can be configured to allow a discharge of the battery to power the electrical machine (for non-emergency performance enhancement or transient response) only to a OEI threshold where there is still enough energy to comply with the OEI power requirements.

In certain embodiments, in a normal cruise mode, the one or more control modules 111 can be configured to reduce power of one of the first thermal engine 103a and the second thermal engine 103b to idle or off (for fuel efficiency), and to operate the other of the first and second thermal engine 103a, 103b at a set thermal cruise power suitable for level flight, for example (or to any other type of flight that can be performed by a single thermal engine). The one or more control modules 111 can be configured such that, during cruise, if a demanded power changes to be above the set thermal cruise power (producible by the single thermal engine), the one or more control modules 111 can cause the electrical machine 105 to output an electrical machine power that is a difference of power between a current thermal power and the demanded power until a total thermal power produced by either or both of the first thermal engine 103a and/or the second thermal engine 103b reaches the demanded power. In certain embodiments, the electrical machine power ramps down as the total thermal power (e.g., the total power of both thermal engine 103a, 103b ramps up to maintain the demanded power (e.g., essentially compensating for a loss of torque/power in certain embodiments).

In certain embodiments, the one or more control modules 111 can be configured such that, in cruise, if the thermal engine (e.g., first thermal engine 103a) that is producing the set thermal cruise power fails, the one or more control modules 111 is configured to ramp up power from the idle or off thermal engine (e.g., second thermal engine 103b) to the demanded power and to produce the remaining power required using the electrical machine 105 (e.g., the difference of demanded power and thermal power). The one or more control modules 111 can be configured to have any suitable control logic (e.g., otherwise disclosed herein or appreciated by those having ordinary skill in the art in view of this disclosure), e.g., for any situation (e.g., emergency, normal, performance, or transient response use of the electric motor).

In certain embodiments, the one or more control modules 111 can have a control function that is dedicated to each lane. The physical housing of the processing elements performing control function may be combined, separated, or segregated in any suitable manner as appreciated by those having ordinary skill in the art. The one or more control modules 111 can receive signals from one or more rotorcraft systems with rotorcraft-level commands (throttle, CLP, mode select, etc.), and the one or more control modules 111 can calculate and transmit the power and speed commands to each individual power lane.

In accordance with at least one aspect of this disclosure, a rotorcraft (not shown) can include a rotor (not shown) and any suitable embodiment of a system as disclosed herein, e.g., system 100 as described above, connected to the rotor to power the rotor. Any other suitable components are contemplated herein.

A non-transitory computer readable medium can include computer executable instructions configured to cause a computer to perform a method for controlling power in a multiengine rotorcraft. The method can include reducing power of one of a first or second thermal engine to idle or off, and operating the other of the first or second thermal engine at a set thermal cruise power suitable for level flight. During cruise, if a demanded power changes to be above the set thermal cruise power, the method can include causing an electrical machine to output an electrical machine power that is a difference of power between a current thermal power and the demanded power until a total thermal power produced by either or both of the first thermal engine and/or the second thermal engine reaches the demanded power. In certain embodiments, the method can include ramping electrical machine power down as the total thermal power ramps up to maintain the demanded power.

Embodiments can include a hybrid electric propulsion system (HEPS) for a rotorcraft which can be configured to use an electric motor to provide OEI power in the event of engine failure. Instead of having to enter a power reserve regime that is over and above rated maximum takeoff power for a traditional engine (which can only be done for a very limited period of time without destroying the engine), the thermal engine can be configured to operate at a maximum continuous rating without the need for such a power reserve, and the electric motor can be used to backfill any required power, e.g., to provide suitable OEI power or performance enhancement and/or transient response.

In certain embodiments, the electrical machine is not necessary for normal use, but can be used for efficiency (allowing one engine to idle or completely shut off while providing transient response), emergency, and performance enhancements (e.g., mode to be selected by the pilot). In certain embodiments, the thermal engines can be smaller and the battery need not be particularly large, making the whole system lighter (including less robust mechanical connections to the gearbox as the amount of maximum torque from any single powerplant is reduced).

In certain embodiments, electrical machine can be used as an auxiliary power unit (APU), e.g., in an APU mode, to drive hydraulics, and electrical energy can be taken directly from the battery if necessary for other APU functions. Embodiments can also have the electrical machine to be placed in its own fire zone so high voltage wires can be segregated from fuel components In certain embodiments, in takeoff, just the thermal engines can be used unless the electric motor is intentionally selected by the pilot to provide more power, for example. In certain embodiments, during flight, the electric motor may be used in transients only (e.g., while waiting for thermal engines to ramp up), e.g., to climb over obstacles.

Certain embodiments allow a single thermal engine to be used, and to put other engine(s) at idle or off for efficient cruise. The electric motor can be used for OEI power only if needed, for example. If the operating engine fails, for example then the e-motor can be used to provide maximum power until the idle/off motor powers up. After this, the electric motor can be used as needed from then on if OEI power is needed, for example (e.g., to climb). In certain embodiments, the electric motor may only be used to make up for power only when absolutely needed (e.g., only for engine failure scenarios) which can minimize the battery size and weight.

In order to allow Category A operations for traditional two gas turbine engine-powered aircraft, each gas turbine must be rated to OEI power ratings (e.g. 30 second, 2 minute, continuous OEI ratings). Category A is a standard of design and operation outlined in helicopter certification requirements—FAR/CS29/AWM529. Category A certification is required for higher risk operations such as extended flight over remote areas without landing areas (e.g. forests, water, or urban areas). The OEI power is an auxiliary power rating above the maximum takeoff power (MTOP) that is only used in emergency and/or failure events. The helicopter maximum takeoff weight, performance, and operations are architected around the availability of OEI power in the event that one engine shuts down in flight. The safety criticality of OEI power dictates invasive and expensive checks to guarantee the power availability. Checks may include engine power assurance checks (EPAC), maintenance inspections, cycle counting, etc.

In certain embodiments, uncovering of potential latency of failures causing the electric motor to be unable to reach full power can be automated. In certain embodiments, during the flight, both thermal engines can reduce power and allow the electric motor to backfill the required torque to reach the commanded torque until the electric motor reaches the rated torque for OEI power. Lowering the power of both thermal engines allows functional capability in case a subsequent failure of a thermal engine occurs during the electric motor torque availability check (e.g., for category A type flights).

With the use of a parallel hybrid-electric propulsion system (HEPS) with three torque sources, e.g., two thermal and one electrical as shown in the embodiment of FIG. 1, the propulsion system and rotorcraft can be optimized to provide improved performance without sacrificing safety. As disclosed above, a HEPS architecture can include two thermal engine-provided power sources and one electrical-provided power source (e.g. electrical motor) connected to the helicopter main gearbox (MGB), each with a mechanical disconnect. If 100% maximum takeoff power (MTOP) is required for a helicopter takeoff rating, then each thermal engine can be rated to 50% helicopter MTOP.

As an example, if 75% power is required for the highest OEI rating, the electrical motor can be rated to the difference between the OEI rating and single engine rating (i.e. 75%–50%=25% MTOP). Any other suitable numbers are contemplated herein.

The HEPS can run the combination of power sources as optimized for performance, fuel efficiency, power availability required for the phase of flight. The electric motor can provide power when required for safety, power availability, and/or performance. During takeoff, both thermal engines can provide all of the takeoff power required. When cruising, one thermal engine can provide the required cruise power while the other can run in low idle or shutdown mode to save fuel, referred to as Single Engine Operation (SEO). If the pilot requires additional power in SEO, the electrical machine can provide near instantaneous power to fill the required power availability or until the other thermal engine can ramp up to meet the power need. This provides greater power availability and minimal impact on helicopter performance with the SEO fuel savings. Rotor droop can be a performance concern for helicopter thermal engines, especially when using a free turbine configuration. The electrical machine can provide almost instantaneous power to mitigate any rotor droop and preserve helicopter performance. In cruise, either of the thermal engines could run at higher power to charge the battery via the electrical machine (operating as a generator).

In the event of a thermal engine failure, the controller or pilot can disconnect the failed engine via the mechanical disconnect, and the electrical machine can provide the power required to meet the One Engine Inoperative (OEI) power rating. In certain embodiments, the maximum continuous OEI rating can be about the same power level as MTOP. The electrical machine can be sized to provide enough power for the 30 second or 2 minute OEI power. In certain embodiments, the battery can be sized for the emergency power ratings plus additional energy for performance enhancements and emergency reserve, for example. Any suitable size is contemplated herein.

Embodiments allow each thermal engine to be rated to the takeoff power instead of the OEI power resulting in reduced weight, fewer required maintenance checks, and no thermal engine EPACs. The electrical machine can be sized to provide emergency or temporary power when required. This allows for reduce sizing of the electrical machine, motor controller, and the battery system. Embodiments can provide redundant sources of power that can be separated and segregated to mitigate from failure propagation (e.g. each power sources is in a different fire zone). With the electrical machine in a different fire zone, the high voltage wiring system can be separated from flammable fluid sources such as fuel.

In embodiments, any and/or all power sources can be designed to provide lower power thereby reducing weight, cost, fuel burn, and space in the aircraft. The thermal engine power sources can be designed for half of the total helicopter MTOP and optimized for single or dual engine cruise. The electrical machine can be designed to provide the remaining OEI power. Having two smaller thermal engines results in weight reduction, lower fuel burn, and lower emissions, for example.

Embodiments of a system can provide greater torque response due to the faster response of the electrical machine. This can allow for improved aircraft-level performance response. The faster response also enables single engine operation without sacrificing performance, safety, or fuel burn savings.

The elimination of thermal engine OEI rating reduces the operational and maintenance burden required to ensure power availability in the case of emergency. EPACs are often run as penalty runs which can be costly. The additional maintenance burden due to the safety criticality such as temperature probe inspection and blade inspection can be reduced. The battery sizing can be optimized for emergency power and performance boosts only. The battery can be recharged off of the thermal engine during the flight. Additionally, the engine output shafts to the MGB do not need to be sized for OEI power. They can be optimized and downsized for MTOP. Accordingly, the use of a parallel hybrid-electric propulsion system (HEPS) having two or more thermal engines and one or more electrical power source can increase efficiencies compared to traditional architectures and provide performance, safety, operations, and weight benefits.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A hybrid electric system for a rotorcraft, comprising:
a first thermal engine drivingly engageable to one or more rotors through a first mechanical disconnect;
a second thermal engine drivingly engageable to the one or more rotors through a second mechanical disconnect;
an electrical machine drivingly engageable to the one or more rotors through a third mechanical disconnect,
wherein the first thermal engine is sized to produce a maximum first thermal engine power that is below a one-or-more-engine-inoperative (OEI) requirement power, wherein the second thermal engine is sized to produce a maximum second thermal engine power that is below the OEI requirement power, and wherein the electrical machine is sized to provide at least a remaining power needed to reach the OEI requirement power in an OEI state; and one or more control modules operatively connected to the first mechanical disconnect and to the second mechanical disconnect, the one or more control modules configured for:

operating the first thermal engine in a single engine operation (SEO) mode while the second thermal engine is either idling or powered off;

determining a thermal engine failure of the first thermal engine;

drivingly disengaging the first thermal engine from the one or more rotors with one or more of the first mechanical disconnect;

drivingly engaging the second thermal engine and the electrical machine to the one or more rotors with the second mechanical disconnect and the third mechanical disconnect, ramping up a power generated by the second thermal engine, during the ramping up of the power of the second thermal engine, powering the electrical machine to produce a power corresponding to a difference between a power required by the second thermal engine for the SEO mode and an actual power produced by the second thermal engine; and as the power generated by the second thermal engine increases, ramping down a power generated by the electrical machine.

2. The system of claim 1, further comprising a battery sized to allow for the OEI power requirement to be reached for at least a required OEI power time.

3. The system of claim 2, wherein the OEI power time is between about 30 seconds and about 2.5 minutes.

4. The system of claim 2, wherein the electrical machine is configured to be driven by the first and/or second thermal engine in an excess thermal power setting to generate electrical energy to charge the battery.

5. The system of claim 1, wherein the one or more control modules are operatively connected to the first thermal engine, the second thermal engine, and the electrical machine to control power output therefrom.

6. The system of claim 1, wherein in a normal take-off mode, the controller is configured to cause output power only from the first thermal engine and the second thermal engine.

7. The system of claim 6, wherein in a performance take-off mode, the controller is configured to additionally cause output power from the electrical machine.

8. The system of claim 5, wherein in a normal cruise mode, the controller is configured to reduce power of one of the first or second thermal engine to idle or off, and to operate the other of the first or second thermal engine at a set thermal cruise power suitable for level flight.

9. The system of claim 8, wherein the controller is configured such that, during cruise, if a demanded power changes to be above the set thermal cruise power, the controller causes the electrical machine to output an electrical machine power that is a difference of power between a current thermal power and the demanded power until a total thermal power produced by either or both of the first thermal engine and/or the second thermal engine reaches the demanded power.

10. The system of claim 1, further comprising a main gear box operatively connected to each of the first thermal engine, the second thermal engine, and the electrical machine to receive power therefrom and to combine the output to one or more rotors.

11. A rotorcraft, comprising:

a rotor;

a main gear box connected to the rotor;

a first thermal engine connected to the main gear box through a first mechanical disconnect;

a second thermal engine connected to the main gear box through a second mechanical disconnect;

an electrical machine connected to the main gear box through a third mechanical disconnect, wherein the first thermal engine is sized to produce a maximum first thermal engine power that is below a one-or-more-engine-inoperative (OEI) requirement power, wherein the second thermal engine is sized to produce a maximum second thermal engine power that is below the OEI requirement power, and wherein the electrical machine is sized and sized to provide at least a remaining power needed to reach the OEI requirement power in an OEI state; and one or more control modules operatively connected to the first mechanical disconnect and to the second mechanical disconnect, the one or more control modules configured for:

operating the first thermal engine in a single engine operation (SEO) mode while the second thermal engine is either idling or powered off;

determining a thermal engine failure of the first thermal engine;

drivingly disengaging the first thermal engine from the rotor with the first mechanical disconnect;

drivingly engaging the second thermal engine and the electrical machine to the rotor with the second mechanical disconnect and the third mechanical disconnect and via the main gear box;

ramping up a power generated by the second thermal engine, during the ramping up of the power of the second thermal engine, powering the electrical machine to produce a power corresponding to a difference between a power required by the second thermal engine for the SEO mode and an actual power produced by the second thermal engine; and as the power generated by the second thermal engine increases, ramping down a power generated by the electrical machine.

12. The rotorcraft of claim 11, further comprising a battery sized to allow for the OEI power requirement to be reached for at least a required OEI power time.

13. The rotorcraft of claim 12, wherein the OEI power time is between about 30 seconds and about 2.5 minutes.

14. The rotorcraft of claim 12, wherein the electrical machine is configured to be driven by the first and/or second thermal engine in an excess thermal power setting to generate electrical energy to charge the battery.

15. The rotorcraft of claim 11, wherein the one or more control modules are operatively connected to the first thermal engine, the second thermal engine, and the electrical machine to control power output therefrom.

16. The system of claim 15, wherein in a normal take-off mode, the controller is configured to cause output power only from the first thermal engine and the second thermal engine.

17. The system of claim 16, wherein in a performance take-off mode, the controller is configured to additionally cause output power to the main gear box from the electrical machine.

18. A non-transitory computer readable medium, comprising computer executable instructions configured to cause a computer to perform a method for controlling power in a multiengine rotorcraft having one or more rotor, the method comprising:

operating a first thermal engine in a single engine operative (SEO) mode while a second thermal engine is either on idle or powered off, each of the first thermal engine and the second thermal engine sized to produce a maximum thermal engine power that is below a one-or-more-engine-inoperative (OEI) requirement power;

determining a thermal engine failure of the first thermal engine;

disengaging the first thermal engine from the one or more rotor;

engaging the second thermal engine to the one or more rotor;

ramping up a power generated by the second thermal engine;

during the ramping up of the power of the second thermal engine, powering the electrical machine to produce a power corresponding to a difference between a power required by the second thermal engine for the SEO mode and an actual power produced by the second thermal engine; and as the power generated by the second thermal engine increases, ramping down a power generated by the electrical machine.

\* \* \* \* \*